US012718533B2

(12) United States Patent
Hirado

(10) Patent No.: US 12,718,533 B2
(45) Date of Patent: Aug. 25, 2026

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Yasuharu Hirado, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 422 days.

(21) Appl. No.: 18/186,231

(22) Filed: Mar. 20, 2023

(65) Prior Publication Data

US 2023/0316731 A1 Oct. 5, 2023

(30) Foreign Application Priority Data

Mar. 31, 2022 (JP) ................................ 2022-060798
Jan. 26, 2023 (JP) ................................ 2023-010488

(51) Int. Cl.

*G06V 10/774* (2022.01)
*G06V 10/44* (2022.01)
*G06V 10/77* (2022.01)

(52) U.S. Cl.

CPC ........ *G06V 10/7747* (2022.01); *G06V 10/454* (2022.01); *G06V 10/7715* (2022.01)

(58) Field of Classification Search

None

See application file for complete search history.

(56) References Cited

U.S. PATENT DOCUMENTS 10,289,962 B2 5/2019 Vinyals et al.
11,636,337 B2 * 4/2023 Tung .................... G06N 3/0464 706/25
2023/0092147 A1 * 3/2023 Shao ...................... G06N 3/045 706/15
2023/0260264 A1 8/2023 Hirado (Continued)

FOREIGN PATENT DOCUMENTS

CN 108921294 A * 11/2018 ............... G06N 3/08
CN 113792871 A * 12/2021 ........... G06F 18/241

(Continued)

OTHER PUBLICATIONS

CN-113792871-A (machine translation) (Year: 2021).*

(Continued)

*Primary Examiner* — John B Strege

(74) *Attorney, Agent, or Firm* — Carter, DeLuca & Farrell LLP

(57) ABSTRACT

An information processing apparatus comprises a learning unit configured to divide a hierarchical structure of a teacher model for obtaining a feature vector of input data into a plurality of sub-structures, and perform learning of a feature extraction unit corresponding to the sub-structure based on input data input to the sub-structure and output data output from the sub-structure based on the input data, and a generation unit configured to generate a student model having a hierarchical structure for obtaining a feature vector of input data using the feature extraction unit learned by the learning unit.

12 Claims, 15 Drawing Sheets

(56) References Cited

U.S. PATENT DOCUMENTS

| | | | | |
|---|---|---|---|---|
| 2023/0401831 | A1* | 12/2023 | Krishnan | G06V 10/7747 |
| 2025/0036951 | A1* | 1/2025 | Sasagawa | G06N 3/08 |

FOREIGN PATENT DOCUMENTS

| | | | | | |
|---|---|---|---|---|---|
| CN | 115018039 | A | * | 9/2022 | G06N 3/084 |
| JP | 2021-119529 | A | | 8/2021 | |
| WO | 2021/259262 | A1 | | 12/2021 | |
| WO | WO-2023030520 | A1 | * | 3/2023 | G06F 18/214 |

OTHER PUBLICATIONS

Romero, A. et al., "Fitnets: Hints for Thin Deep Nets" ICLR, arXiv: 1412.6550v4 (Mar. 2015) pp. 1-13.

Notice of Reasons for Refusal issued by the Japanese Patent Office on Jul. 29, 2024 in corresponding JP Patent Application No. 2023-010488, with English translation.

Notice of Reasons for Refusal issued by the Japanese Patent Office on Dec. 2, 2024 in corresponding JP Patent Application No. 2023-010488, with English translation.

Notice of Reasons for Refusal issued by the Japanese Patent Office on Feb. 28, 2025 in corresponding JP Patent Application No. 2023-010488, with English translation.

* cited by examiner

F I G. 1
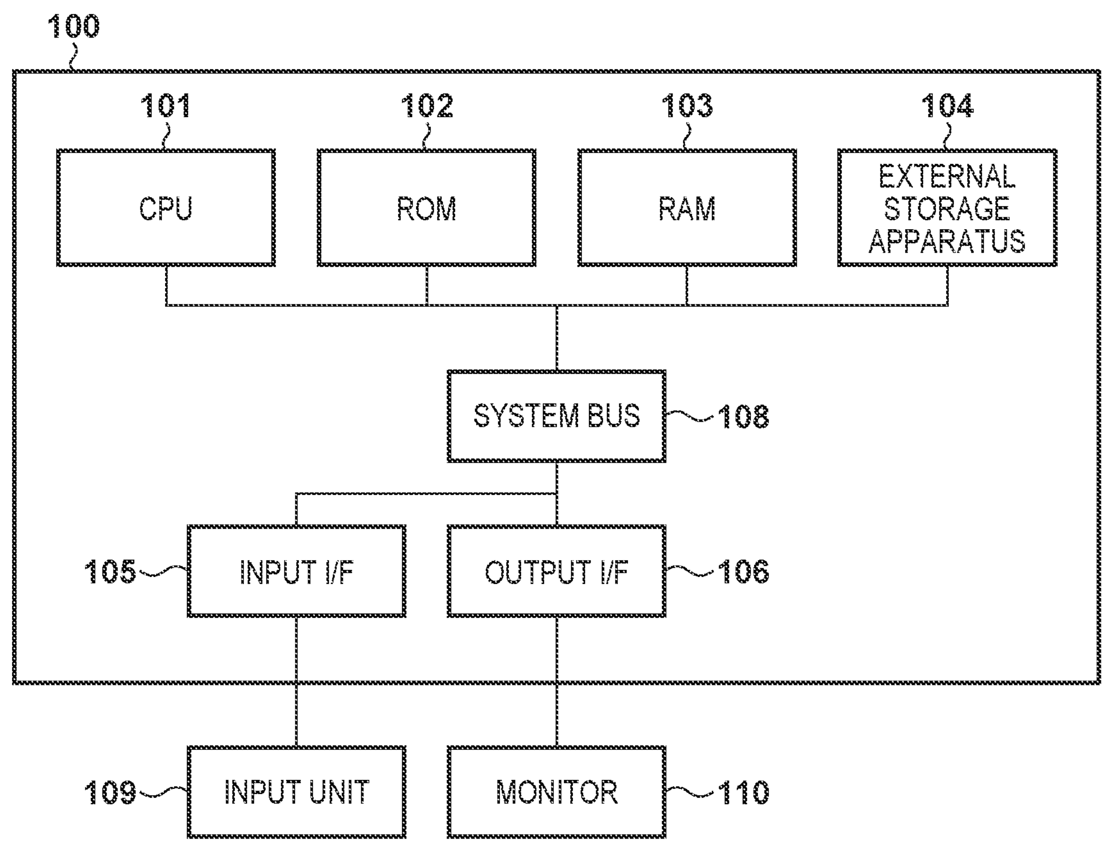

F I G. 3
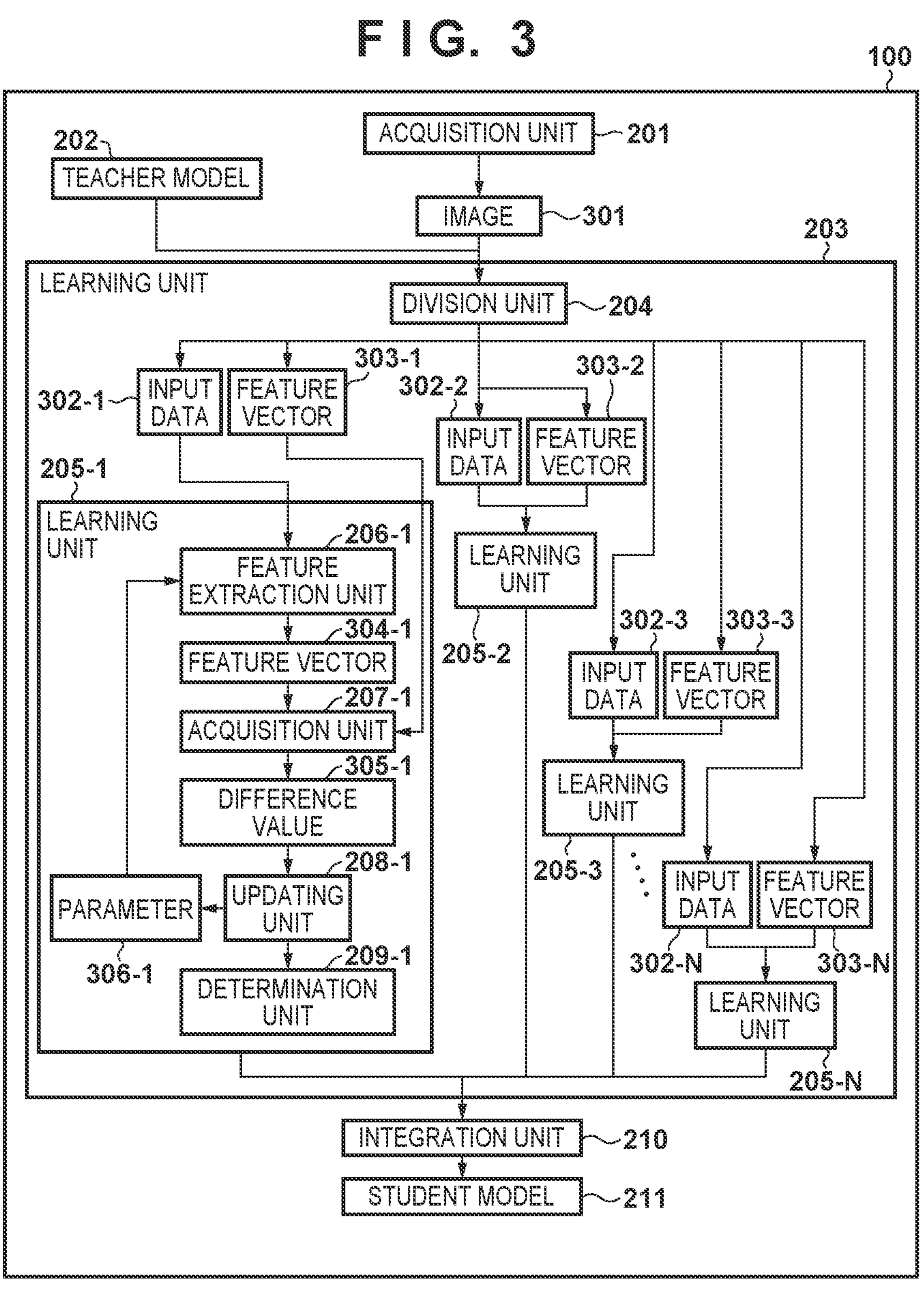

START
ACQUIRE IMAGE
S601
S602
ARE LEARNING FOR ALL FEATURE EXTRACTION UNITS ENDED ?
NO
YES
S603
FOR i = 1 TO N, OBTAIN INPUT DATA 302-i AND FEATURE VECTOR 303-i AND INPUT THEM IN LEARNING UNIT 205-i
S604
LOOP
i=1 ; i<=N ; i++
S605
IS LEARNING FOR FEATURE EXTRACTION UNIT 206-i ENDED ?
NO
YES
S606
EXECUTE LEARNING FEATURE EXTRACTION UNIT 206-i
LOOP
end
S607
INTEGRATE ALL FEATURE EXTRACTION UNITS
S608
END F I G. 8
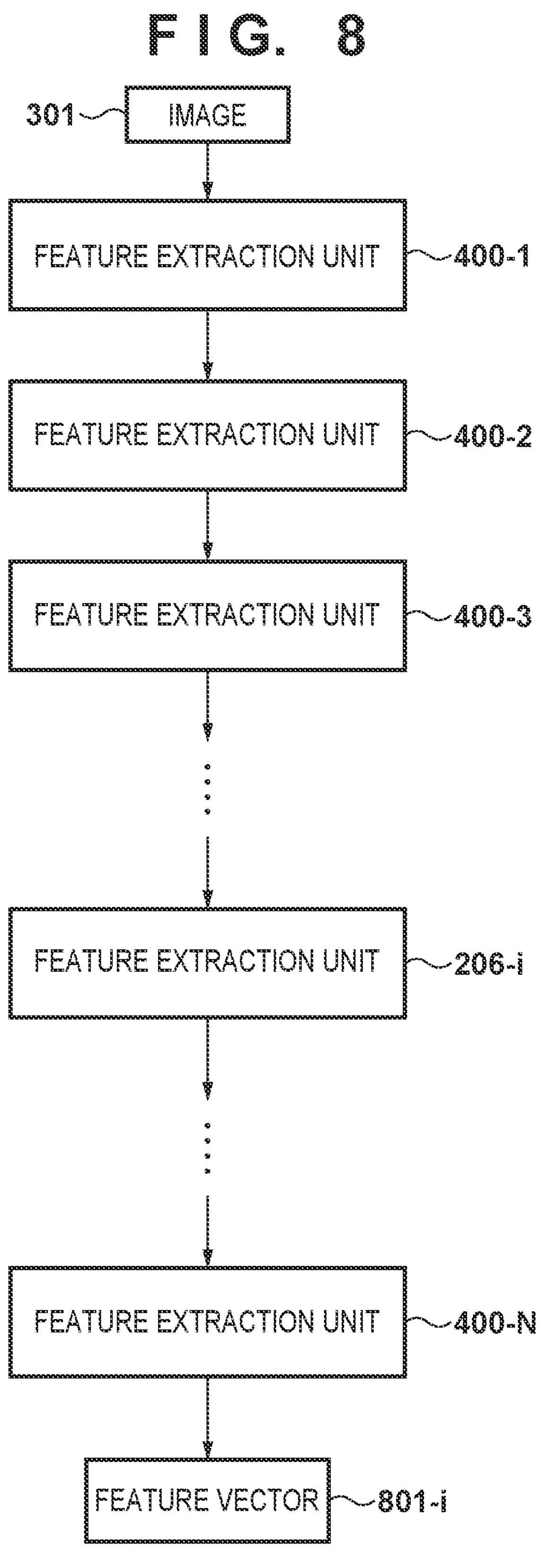

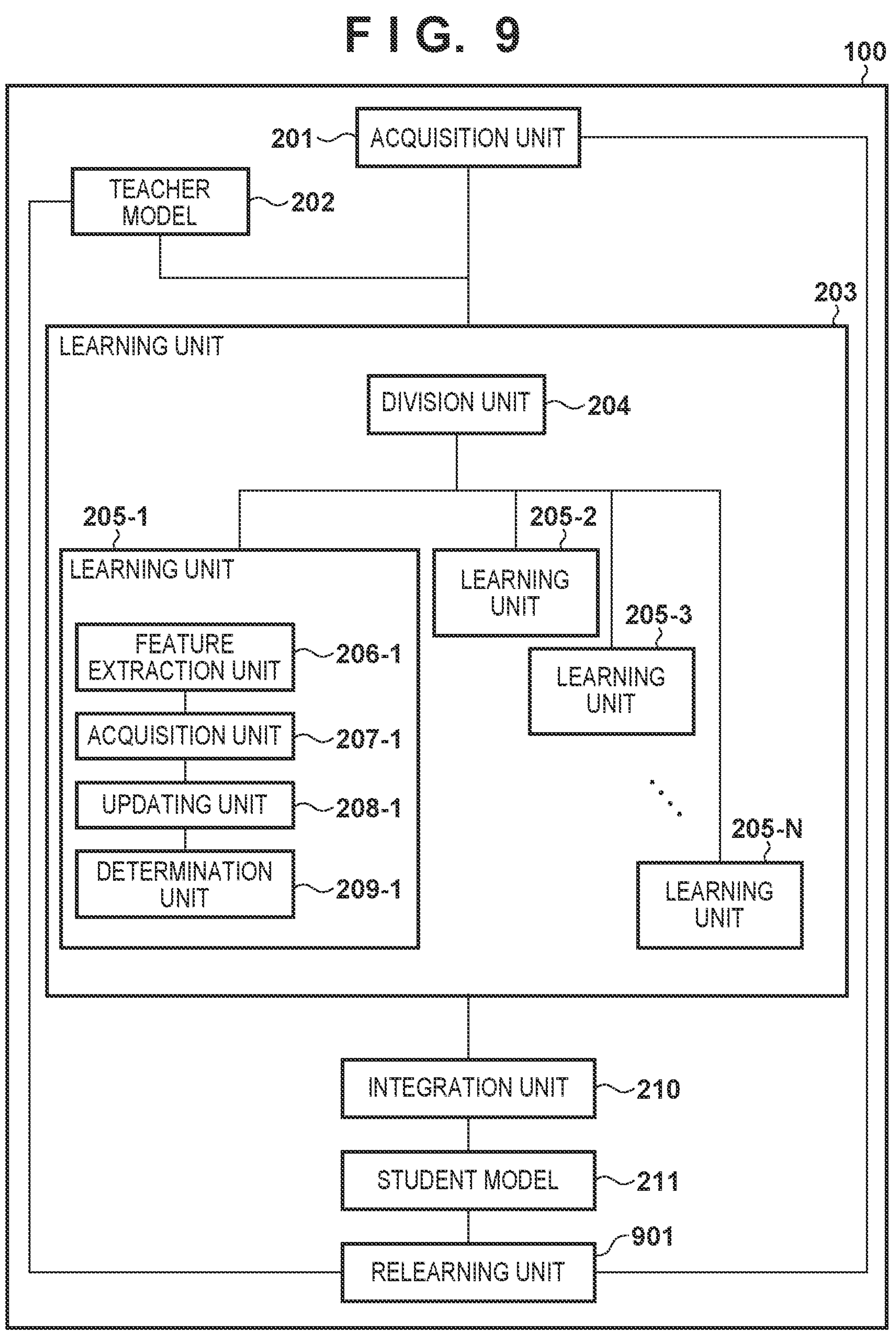
F I G. 9
100
201
ACQUISITION UNIT
TEACHER MODEL
202
203
LEARNING UNIT
DIVISION UNIT
204
205-1
LEARNING UNIT
205-2
LEARNING UNIT
FEATURE EXTRACTION UNIT
206-1
205-3
LEARNING UNIT
ACQUISITION UNIT
207-1
UPDATING UNIT
208-1
205-N
DETERMINATION UNIT
209-1
LEARNING UNIT
INTEGRATION UNIT
210
STUDENT MODEL
211
901
RELEARNING UNIT F I G. 10
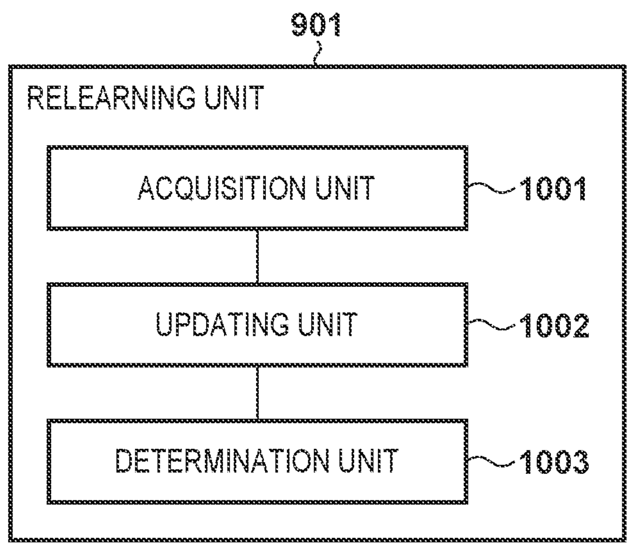

F I G. 11
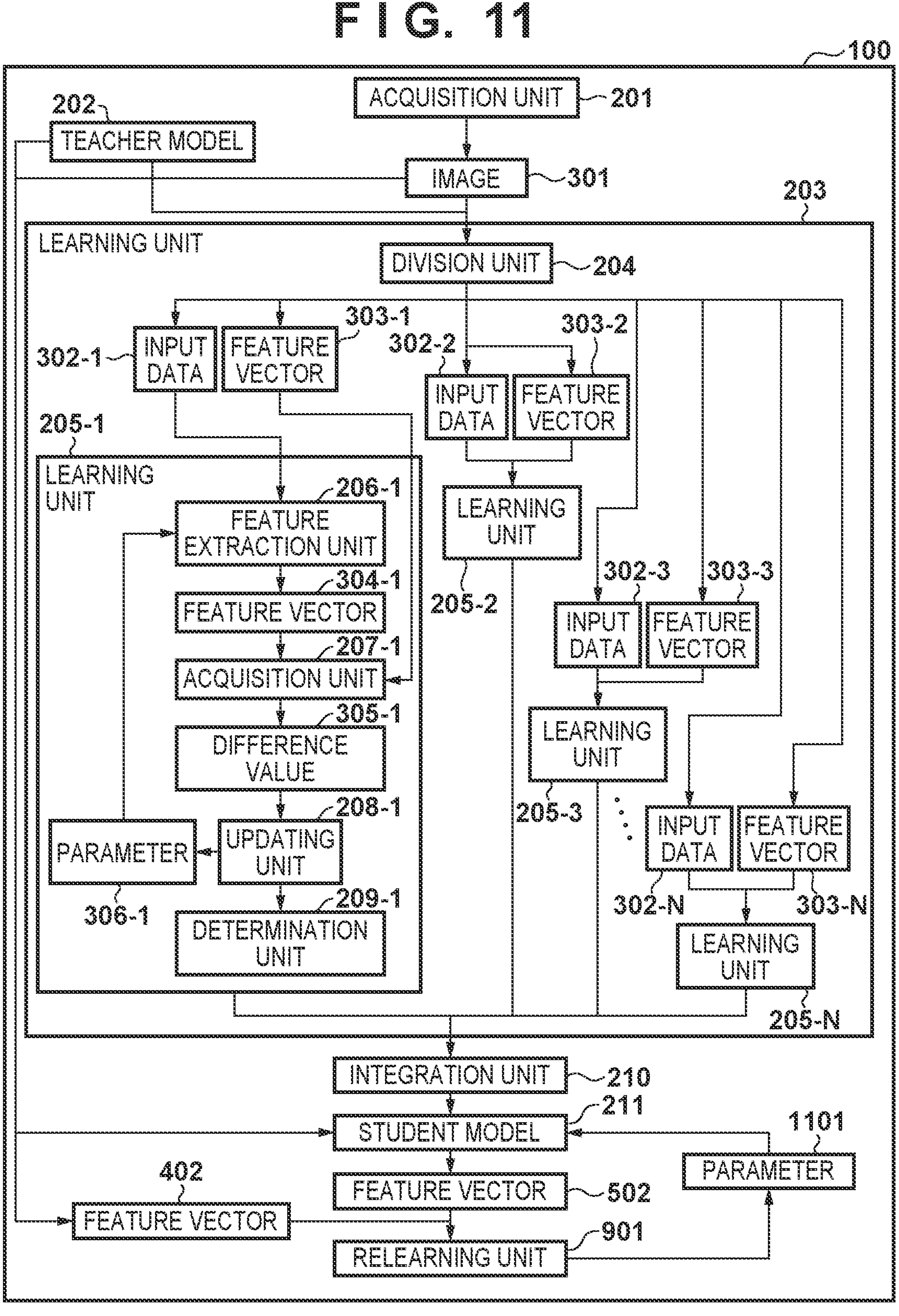

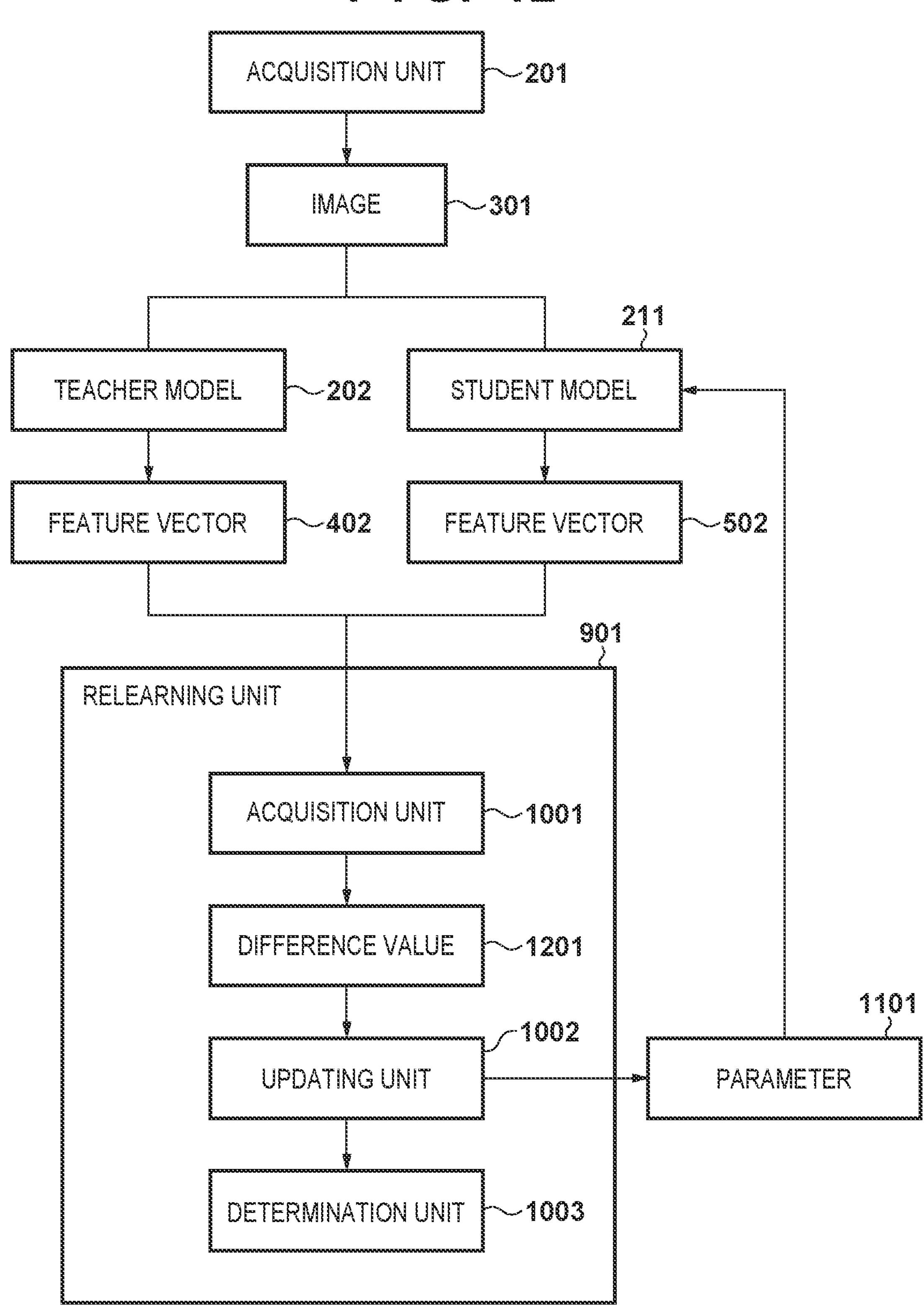
F I G. 12
ACQUISITION UNIT
201
IMAGE
301
TEACHER MODEL
202
STUDENT MODEL
211
FEATURE VECTOR
402
FEATURE VECTOR
502
RELEARNING UNIT
901
ACQUISITION UNIT
1001
DIFFERENCE VALUE
1201
UPDATING UNIT
1002
PARAMETER
1101
DETERMINATION UNIT
1003

FIX PARAMETER (LEARNED)
IMAGE
400-1
400-2
400-3
400-4
RESULT
DIFFERENCE
DIFFERENCE
DIFFERENCE
DIFFERENCE
206-1
206-2
206-3
206-4
LEARN PARAMETER
INTEGRATE 206 AFTER LEARNING ENDED
IMAGE
206-1
206-2
206-3
206-4
RESULT

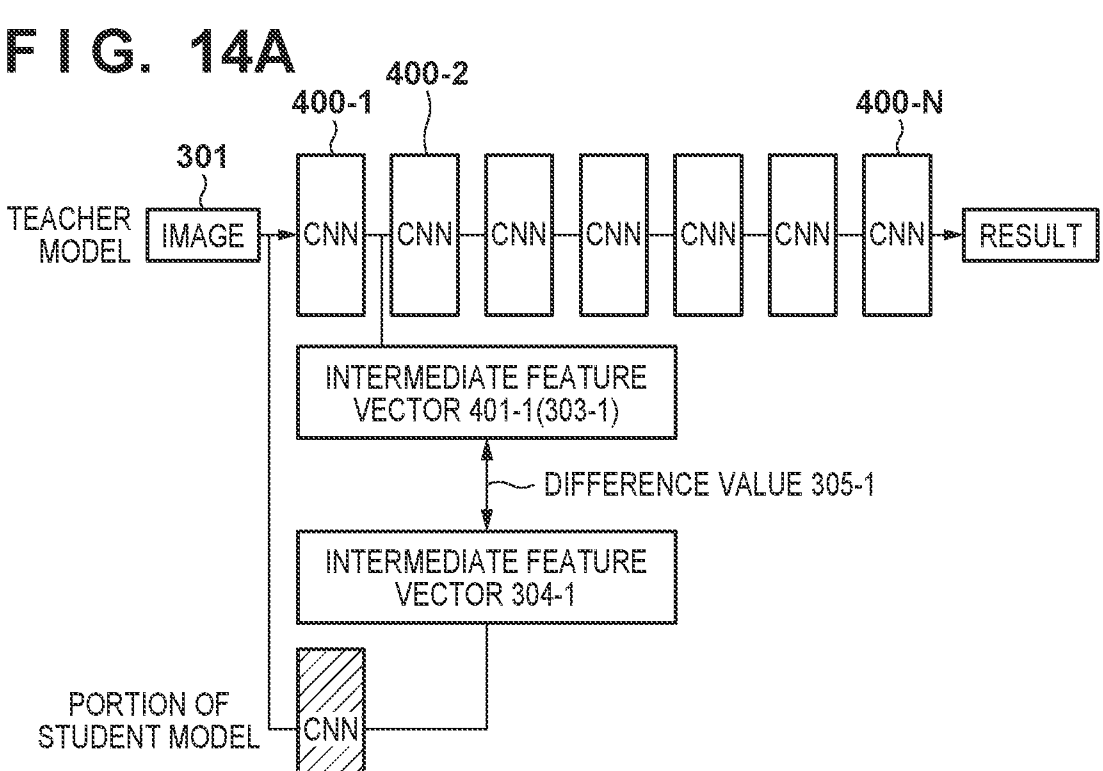
F I G. 14A
400-1
400-2
400-N
301
TEACHER MODEL
IMAGE
CNN
CNN
CNN
CNN
CNN
CNN
CNN
RESULT
INTERMEDIATE FEATURE VECTOR 401-1(303-1)
DIFFERENCE VALUE 305-1
INTERMEDIATE FEATURE VECTOR 304-1
PORTION OF STUDENT MODEL
CNN
206-1
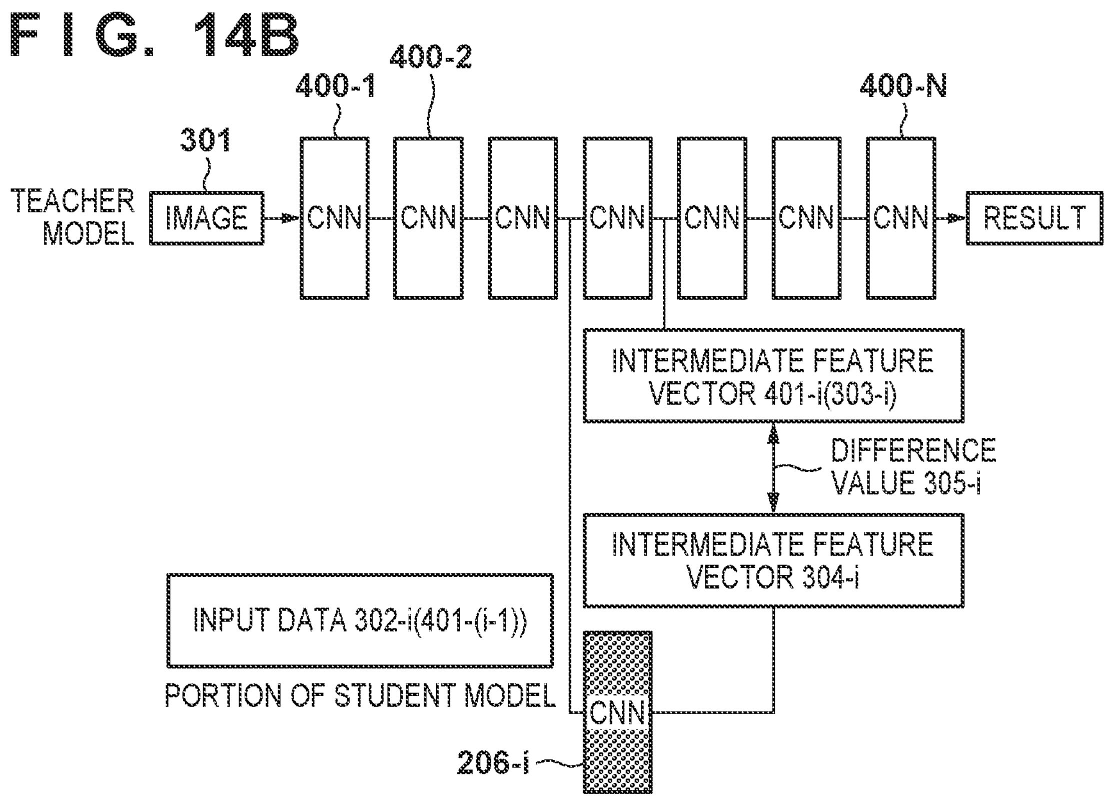
F I G. 14B
400-1
400-2
400-N
301
TEACHER MODEL
IMAGE
CNN
CNN
CNN
CNN
CNN
CNN
CNN
RESULT
INTERMEDIATE FEATURE VECTOR 401-i(303-i)
DIFFERENCE VALUE 305-i
INTERMEDIATE FEATURE VECTOR 304-i
INPUT DATA 302-i(401-(i-1))
PORTION OF STUDENT MODEL
CNN
206-i F I G. 14C
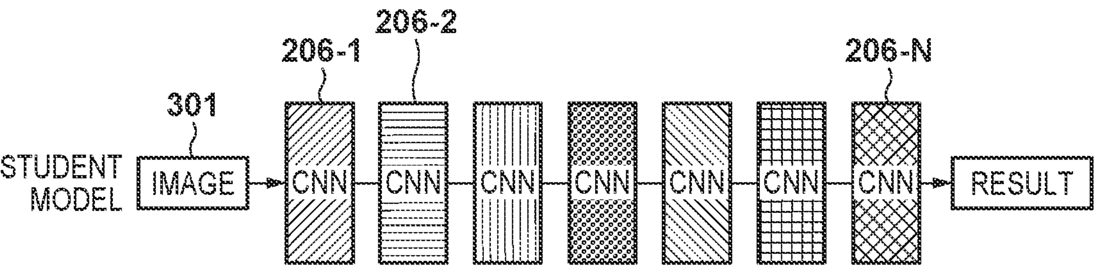

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to a learning technology.

Description of the Related Art

In recent years, there have been proposed a large number of feature extraction technologies for extracting useful information by performing sophisticated processing of images of objects captured in a captured image. Above all, intensive studies are underway on feature extraction technologies for extracting feature vectors of objects in an image using a multilayer neural network called a deep net (also referred to as deep neural net, deep learning, deep machine learning).

While it is well known that feature extraction technologies using deep net are thriving, a deep net learning method called distillation such as that disclosed in U.S. Ser. No. 10/289,962 has been further drawing attention in recent years. Distillation is a method of using a learned deep net model (called a teacher model) to perform learning of a deep net (called a student model) having a different network architecture. Generally, since learning using distillation is often performed for the purpose of slimming down the teacher model, a more simplified network architecture than the teacher model is often prepared as the student model. In distillation, the student model is learned by using feature vectors output by the teacher model in place of correct-answer labels. Therefore, learning using distillation does not require a large number of labeled learning images required for normal learning. It is known that such a distillation technology allows for propagating knowledge of the teacher model to the student model.

The student model learned by the distillation technology is enabled to output substantially equivalent feature vectors as those by the teacher model. Therefore, although the network architecture and parameters and the like attached to the network architecture are different between the student model and the teacher model, when a same image is input to both models, substantially identical feature vectors are output from both models.

In addition, research and development are actively performed, for example, "FITNETS: HINTS FOR THIN DEEP NETS" by Adriana Romero, Nicolas Ballas, Samira Ebrahimi Kahou, Antoine Chassang, Carlo Gatta & Yoshua Bengio discloses a technology for improving the ease of learning using distillation by conducting learning such that an intermediate feature vector generated in the process of calculating a feature vector by a teacher model and an intermediate feature vector generated in the process of calculating a feature vector by a student model are substantially identical to each other.

However, when distillation with a higher degree of difficulty is used, such as for example, distillation in a student model in which the number of parameters for neural network are significantly reduced from the teacher model, the feature vector of the student model and the feature vector of the teacher model may not become substantially identical by using the known methods.

SUMMARY OF THE INVENTION

The present invention provides a technology for making feature vectors obtained from one hierarchical structure and feature vectors obtained from the other hierarchical structure substantially the same for the same input.

According to the first aspect of the present invention, there is provided an information processing apparatus comprising: a learning unit configured to divide a hierarchical structure of a teacher model for obtaining a feature vector of input data into a plurality of sub-structures, and perform learning of a feature extraction unit corresponding to the sub-structure based on input data input to the sub-structure and output data output from the sub-structure based on the input data; and a generation unit configured to generate a student model having a hierarchical structure for obtaining a feature vector of input data using the feature extraction unit learned by the learning unit.

According to the second aspect of the present invention, there is provided an information processing method performed by an information processing apparatus comprising: dividing a hierarchical structure of a teacher model for obtaining a feature vector of input data into a plurality of sub-structures, and performing learning of a feature extraction unit corresponding to the sub-structure based on input data input to the sub-structure and output data output from the sub-structure based on the input data; and generating a student model having a hierarchical structure for obtaining a feature vector of input data using the feature extraction unit learned by the learning.

According to the third aspect of the present invention, there is provided a non-transitory computer-readable storage medium storing a computer program for causing a computer to function as, a learning unit configured to divide a hierarchical structure of a teacher model for obtaining a feature vector of input data into a plurality of sub-structures, and perform learning of a feature extraction unit corresponding to the sub-structure based on input data input to the sub-structure and output data output from the sub-structure based on the input data; and a generation unit configured to generate a student model having a hierarchical structure for obtaining a feature vector of input data using the feature extraction unit learned by the learning unit.

Further features of the present invention will become apparent from the following description of exemplary embodiments with reference to the attached drawings.

BRIEF DESCRIPTION OF THE DRAWINGS

FIG. 1 is a block diagram illustrating an exemplary hardware configuration of an information processing apparatus 100;

FIG. 3 is a block diagram illustrating a flow of data in the information processing apparatus 100;

FIG. 8 is a diagram describing a first modification;

FIG. 9 is a block diagram illustrating an exemplary functional configuration of the information processing apparatus 100;

FIG. 10 is a block diagram illustrating an exemplary functional configuration of a relearning unit 901;

FIG. 11 is a block diagram illustrating a flow of data in the information processing apparatus 100;

FIG. 12 is a diagram describing the operation of the relearning unit 901;

FIG. 14A is an explanatory diagram in which the operation of the image processing apparatus 100 is simplified;

FIG. 14B is an explanatory diagram in which the operation of the image processing apparatus 100 is simplified; and FIG. 14C is an explanatory diagram in which the operation of the image processing apparatus 100 is simplified.

DESCRIPTION OF THE EMBODIMENTS

Figure 2:
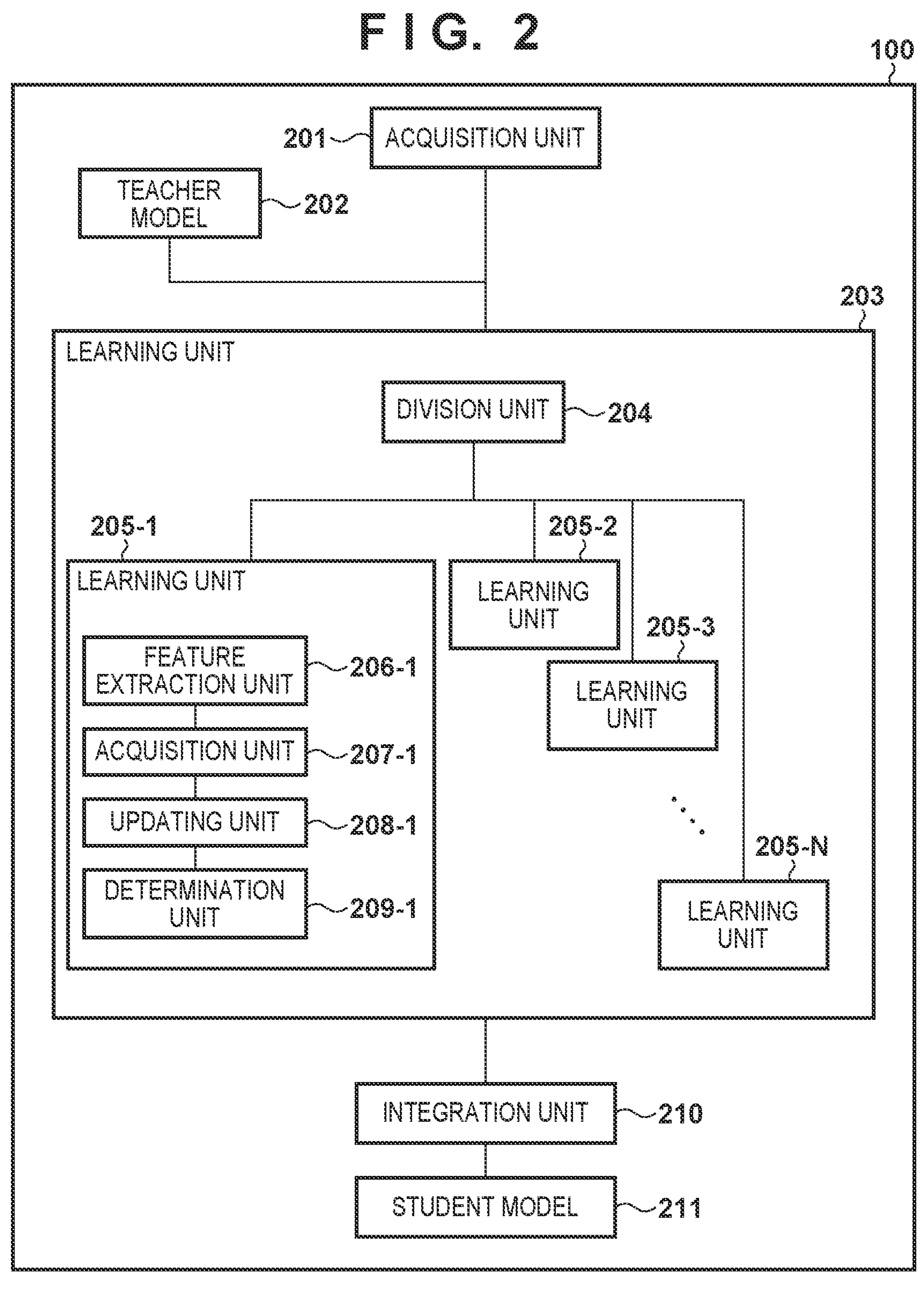
FIG. 2 is a block diagram illustrating an exemplary functional configuration of the information processing apparatus 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, an example of an information processing apparatus will be described in which a hierarchical structure of a teacher model for obtaining a feature vector of input data is divided into a plurality of sub-structures, learning of a feature extraction unit corresponding to the sub-structure is performed based on input data input to the sub-structure and output data output from the sub-structure based on the input data, and a student model having a hierarchical structure for obtaining the feature vector of the input data is generated using the learned feature extraction unit.

First, an exemplary hardware configuration of an information processing apparatus 100 according to the present embodiment will be described, referring to the block diagram illustrated in FIG. 1. A computer apparatus such as a Personal Computer (PC), a smartphone and a tablet terminal apparatus may be applied to such the information processing apparatus 100 according to the present embodiment.

A CPU 101 executes various kinds of processing by using a computer program and data stored in a ROM 102 or a RAM 103. Accordingly, the CPU 101 controls operation of the entire information processing apparatus 100, and also executes or controls various processing described to be performed by the information processing apparatus 100.

In the ROM 102, setting data of the information processing apparatus 100, a computer program and data relating to activation of the information processing apparatus 100, a computer program and data relating to the basic operation of the information processing apparatus 100, or the like are stored.

The RAM 103 includes an area for storing a computer program and data loaded from the ROM 102 or an external storage apparatus 104, and a work area to be used when the CPU 101 executes various processing. As such, the RAM 103 can provide various areas as appropriate.

The external storage apparatus 104 is a storage apparatus such as a hard disk drive, a memory card, an optical disk such as a flexible disk (FD) or a compact disc (CD) that is attachable and detachable to and from the information processing apparatus 100, a magnetic or optical card, an IC card, or a memory card. In the external storage apparatus 104, an operating system (OS), a computer program and data for causing the CPU 101 to execute or control various processing described to be performed by the information processing apparatus 100, or the like are stored. The computer program and data stored in the external storage apparatus 104 are loaded to the RAM 103 as appropriate according to the control by the CPU 101, which are then subjected to processing by the CPU 101.

The CPU 101, the ROM 102, the RAM 103 and the external storage apparatus 104 are each connected to a system bus 108. An input interface (I/F) 105 and an output I/F 106 are further connected to the system bus 108.

An input unit 109 is connected to the input I/F 105. The input unit 109, which is a user interface such as a keyboard, a mouse, or a touch panel, can be operated by a user to input various instructions to the CPU 101.

A monitor 110 is connected to the output I/F 106. A monitor 110, which includes a liquid crystal screen or a touch panel screen, displays processing results of the CPU 101 in images, characters, or the like. Note that a projecting apparatus such as a projector configured to project images or characters may be connected to the output I/F 106 instead of or in addition to the monitor 110.

An exemplary functional configuration of such the information processing apparatus 100 is illustrated in the block diagram of FIG. 2. Each functional unit of FIG. 2 will be explained below as main units of processing, but the functions of the functional units are actually realized by the CPU 101 executing a computer program that causes the CPU 101 to execute or control the functions of the functional units. Note that one or more of the functional units illustrated in FIG. 2 may be implemented by hardware. A flow of data in the configuration illustrated in FIG. 2 is illustrated in a block diagram of FIG. 3.

An acquisition unit 201 acquires the image 301 for learning from an external storage apparatus 104. Note that an image 301 is not limited to being acquired from the external storage apparatus 104, and for example, may be received from an external apparatus by communication.

An extraction unit 202 obtains a feature vector of the image 301 using a deep net (hierarchical neural network) such as a convolutional neural network (CNN). The extraction unit 202 will be described as a teacher model. A parameter (weight value etc.) of the deep net is a parameter already acquired by learning, and this parameter is not changed in the learning process of the present embodiment.

A learning unit 203 includes a division unit 204 and N (N is an integer greater than or equal to 2) learning units (learning unit 205-1, . . . , learning unit 205-N). The division unit 204 divides a plurality of layers constituting the deep net used by the extraction unit 202 into N groups. For example, in a case where the deep net used by the extraction unit 202 includes 10 layers and the 10 layers are divided into four groups, the division unit 204 sequentially divides the layers from the input layer as a group of two layers, a group of three layers, a group of three layers, and a group of two layers. The division may be performed according to any standard. For example, the division unit 204 may perform division such that the number of parameters in each group is equal. In this manner, the division unit 204 divides the hierarchical structure of the deep net used by the extraction unit 202 into a plurality of sub-structures.

Figure 4:
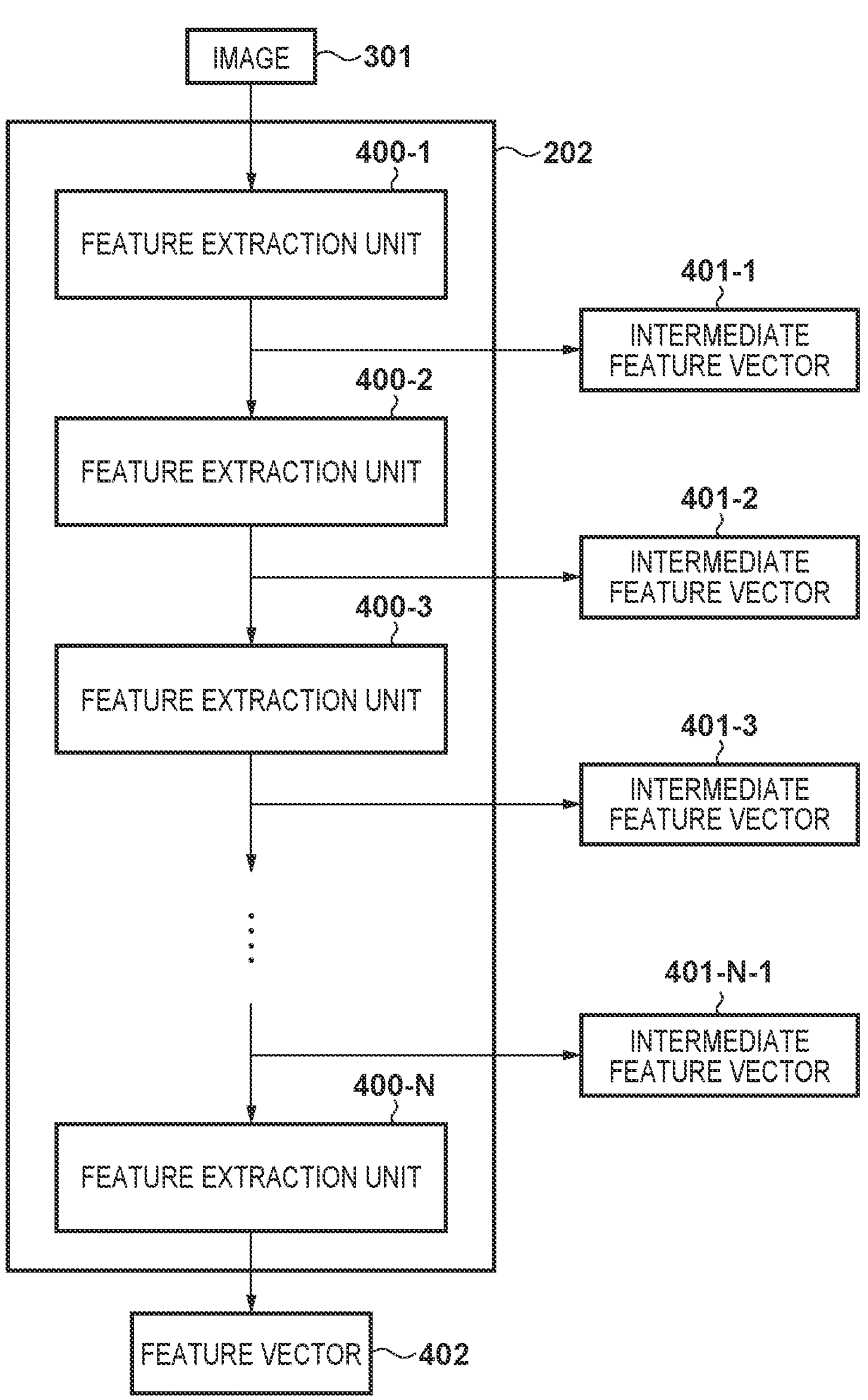
FIG. 4 is a diagram illustrating an example of division by a division unit 204.

In the present embodiment, as illustrated in FIG. 4, the division unit 204 divides a plurality of layers constituting the deep net used by the extraction unit 202 into N groups, and sets an i-th (1≤i≤N) group as a feature extraction unit 400-*i*. The feature extraction unit 400-1 operates using an image 301 as input data, and outputs an intermediate feature vector 401-1 as output data. The feature extraction unit 400-*j* (2≤j≤N−1) operates using the intermediate feature vector 401-(*j*−1) as input data, and outputs the intermediate feature vector 401-*j* as output data. The feature extraction unit 400-N operates using the intermediate feature vector 401-(N−1) as input data, and outputs a feature vector 402 as output data.

Then, the division unit 204 inputs, to the learning unit 205-*i*, the data used as the input data by the feature extraction unit 400-*i* as input data 302-*i*, and the data output as the output data by the feature extraction unit 400-*i* as a feature vector 303-*i*.

That is, the division unit 204 inputs, to the learning unit 205-1, the image 301 used as the input data by the feature extraction unit 400-1 as input data 302-1, and the intermediate feature vector 401-1 output as the output data by the feature extraction unit 400-1 as a feature vector 303-1. In addition, the division unit 204 inputs, to the learning unit 205-2, the intermediate feature vector 401-1 used as the input data by the feature extraction unit 400-2 as input data 302-2, and the intermediate feature vector 401-2 output as the output data by the feature extraction unit 400-2 as a feature vector 303-2. In addition, the division unit 204 inputs, to the learning unit 205-N, the intermediate feature vector 401-(N−1) used as the input data by the feature extraction unit 400-N as input data 302-N, and the feature vector 402 output as the output data by the feature extraction unit 400-N as a feature vector 303-N.

Hereinafter, the configuration and operation of the learning unit 205-1 will be described, but the configuration and operation of other learning units (learning units 205-2 to 205-N) are similar. The feature extraction unit 206-1 is an extraction unit (hierarchical neural network) that operates similarly to the corresponding feature extraction unit 400-1, but is an extraction unit having a configuration in which a calculation amount and a parameter data amount are smaller than those of the feature extraction unit 400-1. The feature extraction unit 206-1 obtains a feature vector 304-1 from the input data 302-1. Note that the number of dimensions of the feature vector 303-1 is the same as the number of dimensions of the feature vector 304-1, and for example, in a case where the feature vector 303-1 is a 512 dimensional vector, the feature vector 304-1 is also a 512 dimensional vector.

The acquisition unit 207-1 obtains a difference value 305-1 between the feature vector 303-1 and the feature vector 304-1. The method for obtaining the difference value 305-1 is not limited to a specific method. For example, the acquisition unit 207-1 obtains a square value $Dk=(Ak-Bk)^2$ of a difference between an element Ak of the feature vector 303-1 (k=1 to K: K is the number of dimensions of the feature vector 303-1) and an element Bk of the feature vector 304-1. Then, the acquisition unit 207-1 obtains a value (mean square error) obtained by dividing the sum of the square values (D1+D2+, . . . , +DK) by K as the difference value 305-1.

An updating unit 208-1 obtains a parameter 306-1 of the feature extraction unit 206-1 by a backpropagation method or the like such that the difference value 305-1 becomes smaller, and updates the parameter of the feature extraction unit 206-1 to the obtained parameter 306-1. That is, the updating unit 208-1 learns the feature extraction unit 206-1 such that the difference value 305-1 becomes smaller.

A determination unit 209-1 determines whether or not an end condition of the learning of the feature extraction unit 206-1 by the updating unit 208-1 is satisfied. The "end condition of the learning of the feature extraction unit 206-1" is not limited to a specific condition, and may be one or more. For example, this may be "the difference value 305-1 is less than or equal to the threshold value", "the change amount of the difference value 305-1 is less than or equal to the threshold value", "the number of learnings is greater than or equal to the threshold value", "the elapsed time from the start of learning is greater than or equal to the threshold value", and the like, and may be 1 or 2 or more of these.

As described above, the other learning units also perform similar operations to perform learning of the feature extraction unit 206-*i*. That is, in the learning unit 205-*i*, the feature extraction unit 206-*i* obtains the feature vector 304-*i* from the input data 302-*i* similarly to the corresponding feature extraction unit 400-*i*. The acquisition unit 207-*i* obtains the difference value 305-*i* between the feature vector 303-*i* and the feature vector 304-*i*. The updating unit 208-*i* obtains a parameter 306-*i* of the feature extraction unit 206-*i* by a backpropagation method or the like such that the difference value 305-*i* becomes smaller, and updates the parameter of the feature extraction unit 206-*i* to the obtained parameter 306-*i*. That is, the updating unit 208-*i* learns the feature extraction unit 206-*i* such that the difference value 305-*i* becomes smaller. The determination unit 209-*i* determines whether or not an end condition of the learning of the feature extraction unit 206-*i* by the updating unit 208-*i* is satisfied.

Figure 5:
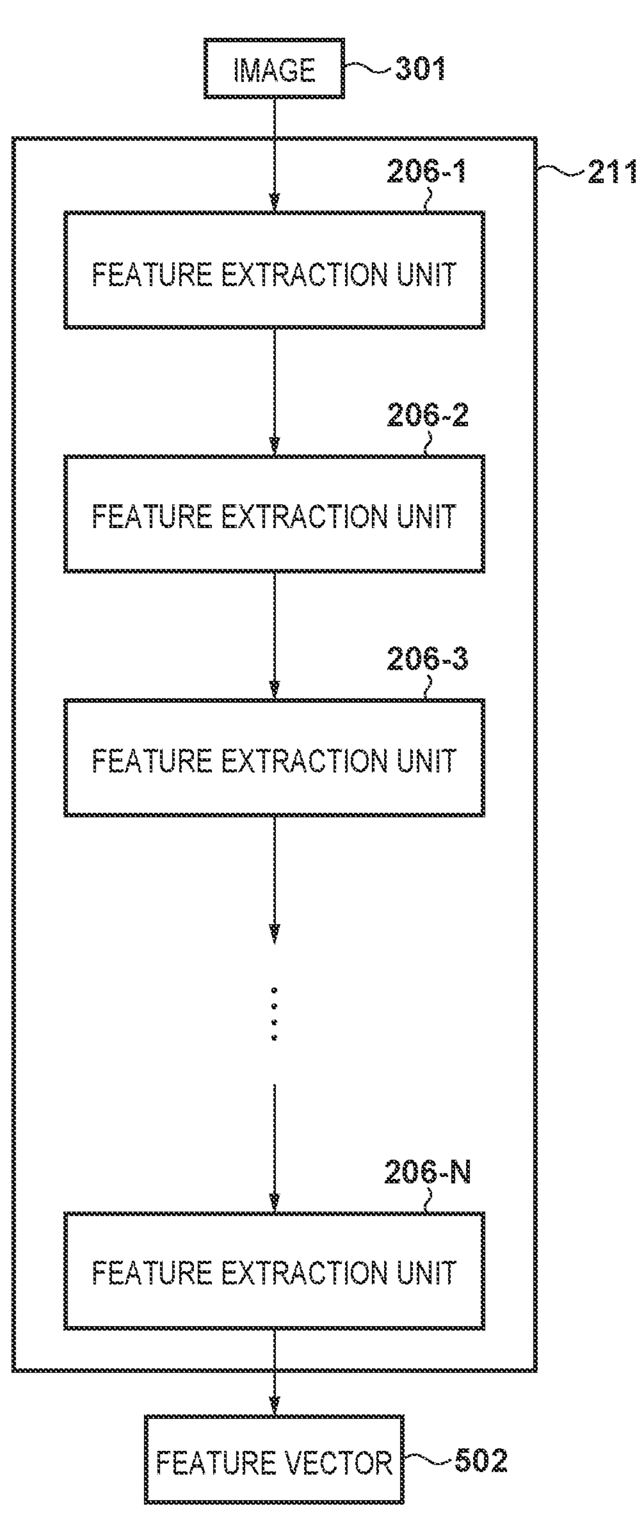
FIG. 5 is a diagram illustrating an exemplary configuration of an extraction unit 211.

In a case where determination is made that the end condition of the learning is satisfied in all the determination units (determination units 209-1 to 209-N), an integration unit 210 integrates the feature extraction unit 206-1, the feature extraction unit 206-2, . . . , and the feature extraction unit 206-N to generate the extraction unit 211. For example, as illustrated in FIG. 5, the integration unit 210 generates, as the extraction unit 211, a hierarchical neural network having a configuration in which the feature extraction unit 206-1, the feature extraction unit 206-2, . . . , and the feature extraction unit 206-N are coupled in this order from the input layer side.

When the image 301 is input to the extraction unit 211, the feature extraction unit 206-1 obtains an intermediate feature vector from the image 301 and outputs the intermediate feature vector. The feature extraction unit 206-*i* (2≤i≤N−1) obtains another intermediate feature vector from the intermediate feature vector output from the feature extraction unit 206-(*i*−1) and outputs the obtained intermediate feature vector. The feature extraction unit 206-N obtains a feature vector 502 of the image 301 from the intermediate feature vector output from the feature extraction unit 206-(N−1) and outputs the feature vector.

The integration unit 210 may store the extraction unit 211 generated in this manner in the external storage apparatus 104 or may transmit the extraction unit to an external apparatus by communication, where the output destination of the extraction unit 211 is not limited to a specific output destination.

Since the feature extraction unit 206-*i* outputs a feature vector close to the intermediate feature vector output by the corresponding feature extraction unit 400-*i* by learning, the ultimately obtained feature vector 502 is also a value close to the feature vector 402. In addition, the feature extraction unit 206-*i* constituting the extraction unit 211 has a smaller calculation amount and parameter data amount than those of the corresponding feature extraction unit 400-*i*. Therefore, the calculation amount and the parameter data amount of the extraction unit 211 are smaller than those of the extraction unit 202.

In the learning of parameter of the extraction unit, when the amount of parameters to be learned is enormous, the difficulty level of learning generally increases, but in the present embodiment, the difficulty level of learning can be lowered by the above configuration. As a result, distillation of a highly difficult configuration that cannot be realized by the known method can be easily learned.

Figure 13:
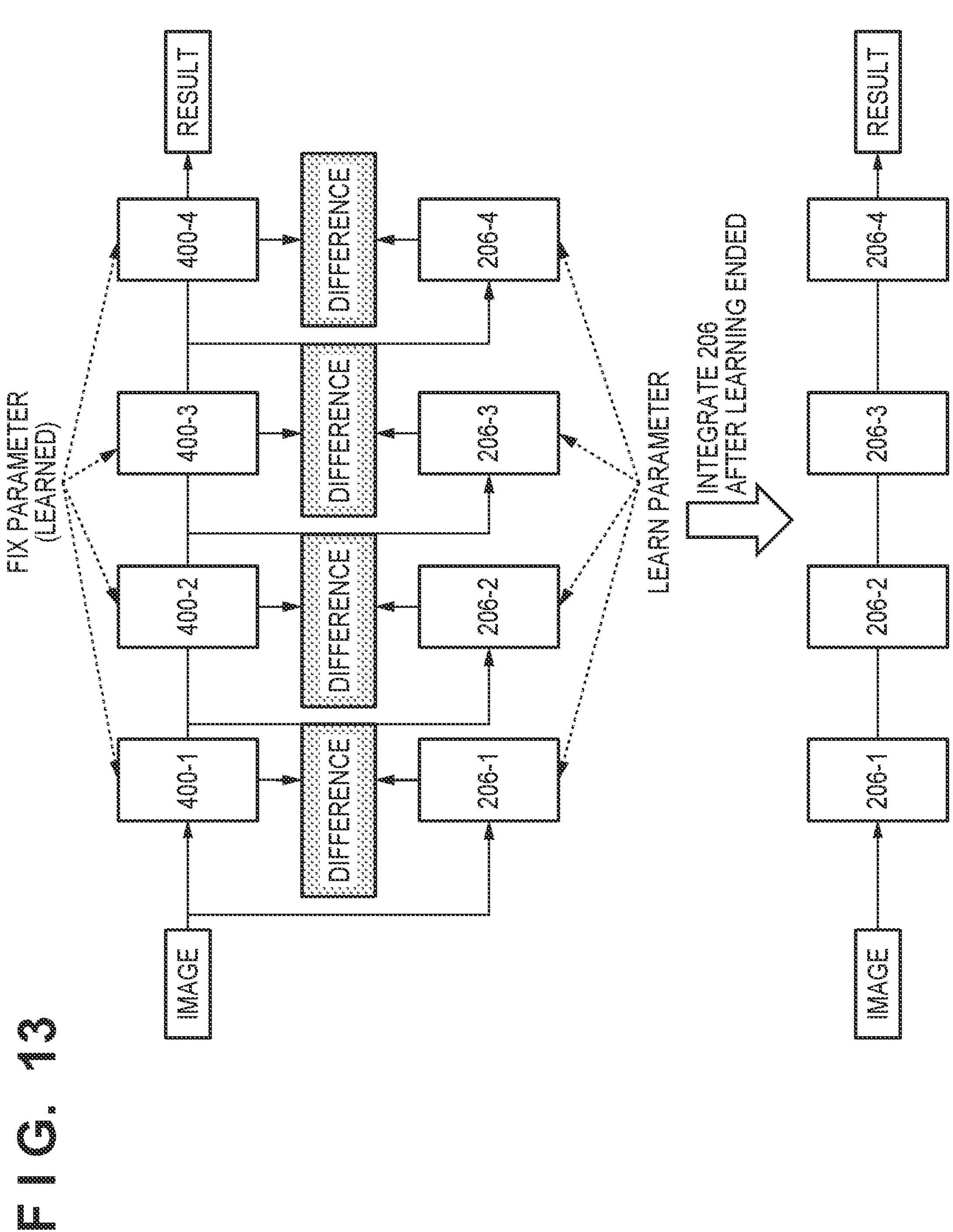
FIG. 13 is an explanatory diagram in which the operation of an image processing apparatus 100 is simplified.

FIG. 13 is an explanatory diagram in which the operation of the information processing apparatus 100 according to the present embodiment is simplified, and the operation of the information processing apparatus 100 described above will be described again with reference to FIG. 13. FIG. 13 illustrates a case where the extraction unit 202 includes four extraction units (feature extraction units 400-1, 400-2, 400-3, 400-4). Since the feature extraction units 400-1, 400-2, 400-3, and 400-4 are learned parameters, the parameters are not updated. Parameters of each of the feature extraction units 206-1, 206-2, 206-3, and 206-4 are updated and learned from difference values between the intermediate feature vectors 401-1, 401-2, 401-3, and 401-4 (synonymous with 303-1, 303-2, 303-3, 303-4), which are outputs of the feature extraction units 400-1, 400-2, 400-3, and 400-4, and the feature vectors 304-1, 304-2, 304-3, and 304-4, which are outputs of each of the corresponding feature extraction units 206-1, 206-2, 206-3, and 206-4, respectively. When all the learning of the feature extraction units 206-1, 206-2, 206-3, and 206-4 is ended, the feature extraction units 206-1, 206-2, 206-3, and 206-4 are integrated to acquire the extraction unit 211. Since the feature extraction units 206-1, 206-2, 206-3, and 206-4 have smaller calculation amount and parameter data amount than the feature extraction units 400-1, 400-2, 400-3, and 400-4, the extraction unit 211 has smaller calculation amount and parameter data amount than the extraction unit 202.

FIGS. 14A to 14C are diagrams illustrating the description of FIGS. 2 to 5 using a configuration of a neural network. FIGS. 14A to 14C illustrate a case where the extraction unit 202 includes N extraction units (feature extraction units 400-1 to 400-N). In FIG. 14A, the neural network of the feature extraction unit 400-1 is to be simplified to a feature extraction unit 206-1. In other words, the extraction unit 202 is to be partially simplified. The updating unit 208-1 updates the parameter of the feature extraction unit 206-1 to reduce the difference value 305-1 between the intermediate feature vector 401-1 (synonymous with 303-1), which is the output of the feature extraction unit 400-1, and the feature vector 304-1, which is the output of the corresponding feature extraction unit 206-1. When the determination unit 209-1 determines that the difference value 305-1 is smaller than a predetermined value, the learning ends. FIG. 14B illustrates a state in which the process similar to that in FIG. 14A is performed on the feature extraction unit 400-*i* (each group divided by the division unit 204). When learning is ended for the extraction unit to be replaced with the student model among the extraction units 202 serving as the teacher model, the feature extraction units 206-1 to 206-N are integrated to acquire the extraction unit 211. All of the feature extraction units 400-1 to 400-N may be replaced with the feature extraction units 206-1 to 206-N, or may be partially replaced. FIG. 14C illustrates a state in which the feature extraction units 206-1 to 206-N are integrated.

Figure 6:
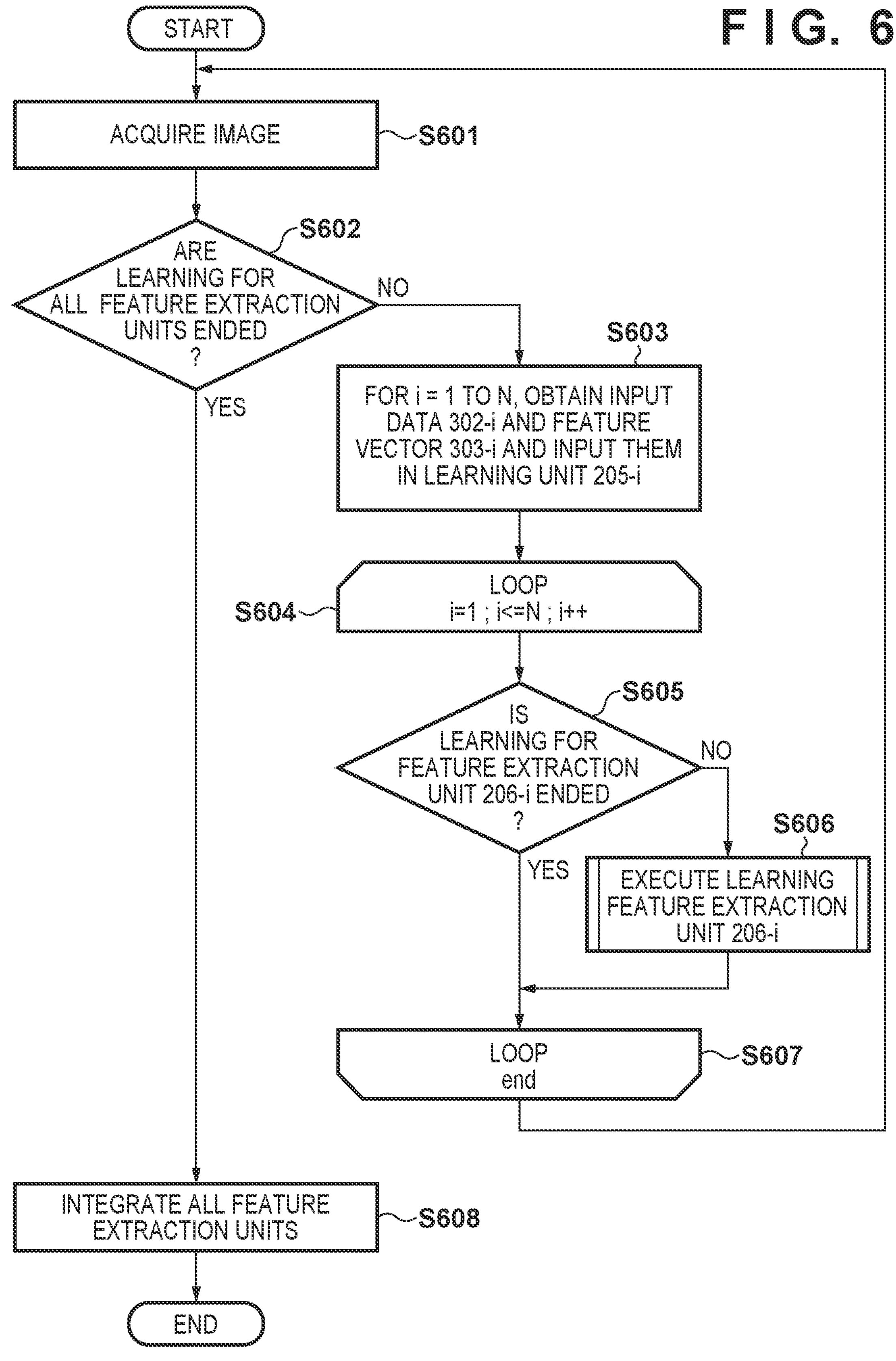
FIG. 6 is a flowchart of processing to be performed by the information processing apparatus 100.

Processing performed by the information processing apparatus 100 to generate the extraction unit 211 will be described according to the flowchart of FIG. 6. In step S601, the acquisition unit 201 acquires the image 301 for learning.

In step S602, the integration unit 210 determines whether or not all the determination units (the determination units 209-1 to 209-N) have determined that the end condition of the learning is satisfied. When all the determination units (determination units 209-1 to 209-N) have determined that the end condition of the learning is satisfied as a result of the determination, the processing proceeds to step S608. On the other hand, when there is one or more determination units among the determination units 209-1 to 209-N that have not determined that the end condition of the learning is satisfied, the processing proceeds to step S603.

In step S603, the extraction unit 202 obtains the feature vector 402 of the image 301 using a deep net such as CNN. The division unit 204 divides the plurality of layers constituting the deep net into N groups (feature extraction units 400-1 to 400-N). Then, for i=1 to N, the division unit 204 acquires the data used as input data by the feature extraction unit 400-*i* as input data 302-*i* and the data output as output data by the feature extraction unit 400-*i* as a feature vector 303-*i*, and inputs the input data 302-*i* and the feature vector 303-*i* to the learning unit 205-*i*. Then, the processes of steps S604 to S607 are performed for i=1 to N.

In step S605, the determination unit 209-*i* determines whether or not an end condition of the learning of the feature extraction unit 206-*i* is satisfied. When the end condition of the learning of the feature extraction unit 206-*i* is satisfied as a result of this determination, the process proceeds to step S607, and when the end condition of the learning of the feature extraction unit 206-*i* is not satisfied, the process proceeds to step S606.

Figure 7:
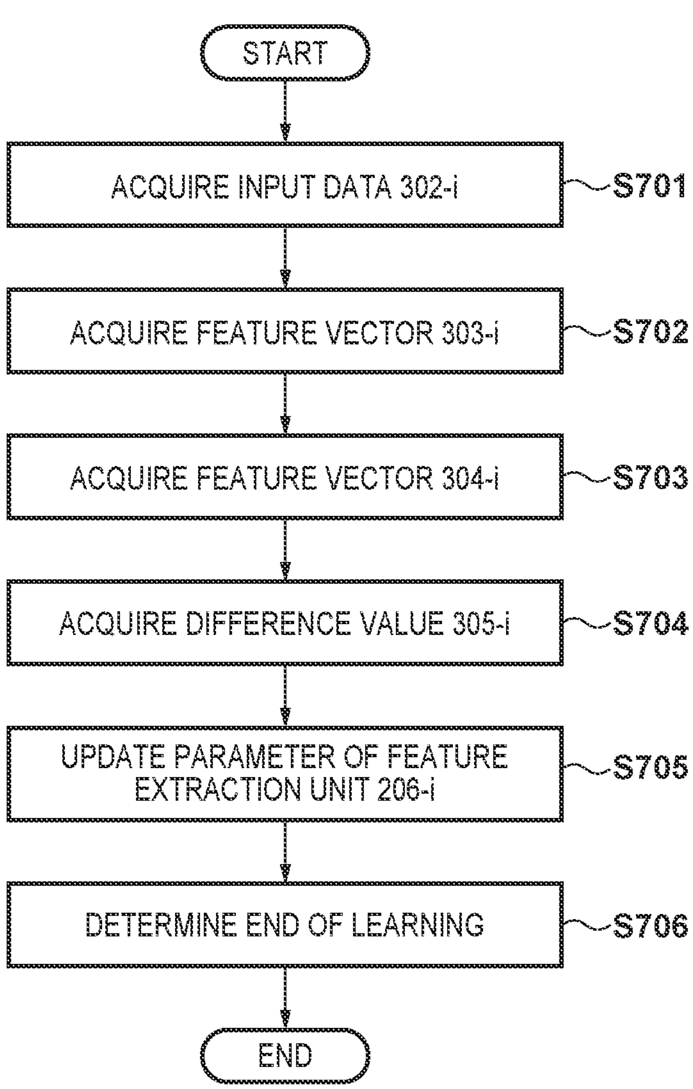
FIG. 7 is a flowchart illustrating details of the processing in step S606.

In step S606, the learning unit 205-*i* learns the feature extraction unit 206-*i*. Details of the processing in step S606 will be described according to the flowchart of FIG. 7. In step S701, the feature extraction unit 206-*i* acquires the input data 302-*i* input from the division unit 204. In step S702, the acquisition unit 207-*i* acquires the feature vector 303-*i* input from the division unit 204.

In step S703, the feature extraction unit 206-*i* operates similarly to the corresponding feature extraction unit 400-*i*, and obtains (acquires) the feature vector 304-*i* from the input data 302-*i*. In step S704, the acquisition unit 207-*i* obtains a difference value 305-*i* between the feature vector 303-*i* and the feature vector 304-*i*.

In step S705, the updating unit 208-*i* obtains a parameter 306-*i* of the feature extraction unit 206-*i* by a backpropagation method or the like such that the difference value 305-*i* becomes smaller, and updates the parameter of the feature extraction unit 206-*i* to the obtained parameter 206-*i*. In step S706, the determination unit 209-1 determines whether or not an end condition of the learning of the feature extraction unit 206-1 by the updating unit 208-1 is satisfied.

Returning to FIG. 6, in step S608, the integration unit 210 couples (integrates) the feature extraction unit 206-1, the feature extraction unit 206-2, and the feature extraction unit 206-N in this order to generate the extraction unit 211.

As described above, according to the present embodiment, the extraction unit 202 serving as a teacher model is divided and distilled, and ultimately integrated to generate the extraction unit 211 serving as a student model. This makes it possible to bring the feature vectors of the student model and the teacher model close to be substantially the same even in distillation with a high degree of difficulty that cannot be realized by the known method.

Modification Example 1

In the first embodiment, learning of the feature extraction unit 206-*i* is performed based on the difference value 305-*i* between the feature vector 303-*i* and the feature vector 304-*i*, but the learning method of the feature extraction unit 206-*i* is not limited to such a learning method. For example, as illustrated in FIG. 8, the learning unit 205-*i* configures an extraction unit (replacement hierarchical structure) in which the feature extraction unit 400-*i* (sub-structure of interest) is replaced with a feature extraction unit 206-*i*, and inputs the image 301 to the configured extraction unit to obtain a feature vector 801-*i*. Then, the learning unit 205-*i* obtains a difference value between the feature vector 801-*i* and the feature vector 402 similarly to the difference value 305-*i*, and learns the feature extraction unit 206-*i* such that the difference value 801-*i* becomes smaller.

Modification Example 2

In the first embodiment, all the feature extraction units 206-1 to 206-N are generated by learning to configure the extraction unit 211. However, some (single or a plurality of) feature extraction units 206-*j* (1≤j≤N) among the feature extraction units 206-1 to 206-N may not be generated by learning. In this case, the integration unit 210 configures the extraction unit 211 with the feature extraction unit 400-*j* as an integration target instead of the feature extraction unit 206-*j*.

In the extraction unit 211 generated according to the present modification in this manner, the calculation amount and the parameter data amount of the portion of the feature extraction unit 400-*i* are not different from those of the extraction unit 202, but the calculation amount and the parameter data amount of the portion of the feature extraction unit 206-*i* are smaller than those of the extraction unit 202. Therefore, the calculation amount and the parameter data amount of the extraction unit 211 are ultimately smaller than those of the extraction unit 202, and it becomes possible to bring the feature vectors of the student model and the teacher model close to be substantially the same even in the distillation with a high degree of difficulty that is difficult to realize by the known method.

Second Embodiment

In the present embodiment, differences from the first embodiment will be described, and it is assumed that the present embodiment is similar to the first embodiment unless otherwise specified. In the present embodiment, relearning of the extraction unit 211 is performed using the feature vector 402 output from the extraction unit 202 serving as a teacher model and the feature vector 502 output from the extraction unit 211 serving as a student model.

An exemplary functional configuration of an information processing apparatus 100 according to the present embodiment is illustrated in the block diagram of FIG. 9. Each functional unit of FIG. 9 will be explained below as main units of processing, but the functions of the functional units are actually realized by the CPU 101 executing a computer program that causes the CPU 101 to execute or control the functions of the functional units. Note that one or more of the functional units illustrated in FIG. 9 may be implemented by hardware. The configuration illustrated in FIG. 9 is obtained by adding the relearning unit 901 to the configuration illustrated in FIG. 2. An exemplary functional configuration of the relearning unit 901 is illustrated in a block diagram of FIG. 10. FIG. 11 is a block diagram illustrating the flow of data in the configuration illustrated in FIGS. 9 and 10.

The relearning unit 901 obtains the parameter 1101 of the extraction unit 211 by a backpropagation method or the like using the feature vector 402 output from the extraction unit 202 and the feature vector 502 output from the extraction unit 211. Then, the relearning unit 901 updates the parameter of the extraction unit 211 to the obtained parameter 1101 (performs learning (relearning) of the extraction unit 211).

The operation of the relearning unit 901 will be described in more detail. FIG. 12 is a diagram describing the operation of the relearning unit 901. As described above, the acquisition unit 201 acquires the image 301, the extraction unit 202 obtains the feature vector 402 from the image 301 and outputs the feature vector, and the extraction unit 211 obtains the feature vector 502 from the image 301 and outputs the feature vector.

The acquisition unit 1001 acquires the feature vector 402 output from the extraction unit 202 and the feature vector 502 output from the extraction unit 211. Then, the acquisition unit 1001 obtains a difference value 1201 between the feature vector 402 and the feature vector 502 (e.g., a mean square error between the feature vector 402 and the feature vector 502).

The updating unit 1002 obtains the parameter 1101 of the extraction unit 211 by a backpropagation method or the like such that the difference value 1201 becomes smaller, and updates the parameter of the extraction unit 211 to the obtained parameter 1101 (that is, performs learning (relearning) of the extraction unit 211).

The determination unit 1003 determines whether or not an end condition of the learning of the extraction unit 211 by the updating unit 1002 is satisfied. The "end condition of the learning of the extraction unit 211" is not limited to a specific condition, and may be one or more. For example, this may be "the difference value 1201 is less than or equal to the threshold value", "the change amount of the difference value 1201 is less than or equal to the threshold value", "the number of leanings is greater than or equal to the threshold value", "the elapsed time from the start of learning is greater than or equal to the threshold value", and the like, and may be 1 or 2 or more of the above. Then, in a case where the determination unit 1003 determines that the "end condition of the learning of the extraction unit 211" is satisfied, the relearning unit 901 ends the learning (relearning) of the extraction unit 211.

A final purpose of distillation is to make the output data from the student model close to the output data from the teacher model when the same data as the data input to the teacher model is input to the student model. The extraction unit 211 is obtained by integrating a feature extraction unit 206-*i* that outputs a feature vector close to that of the feature extraction unit 400-*i*. When the feature vectors 304-1 to 304-N output from the feature extraction units 206-1 to 206-N are different from the feature vectors 303-1 to 303-N output from the feature extraction units 400-1 to 400-N, a difference between the feature vector 402 and the feature vector 502 may become large. In this case, when the relearning unit 901 learns (relearns) the extraction unit 211 such that the difference value 1201 becomes smaller, the feature vector 402 and the feature vector 502 ultimately become close values, and the purpose of distillation can be achieved. Note that the learning of the relearning unit 901 is possible by having the parameters constituting the extraction unit 211 learned in advance by the learning units 205-1 to 205-N. That is, since relearning by the relearning unit 901 can be performed by preliminary learning with fine adjustment of parameters, the difficulty level of distillation of the extraction unit 211 can be simplified.

As described above, according to the present embodiment, the feature vectors of the student model and the teacher model can be brought close to be substantially the same with higher accuracy than in the first embodiment even in distillation with a high degree of difficulty that is difficult to realize by the known method.

Note that the relearning unit 901 performs learning by distillation with the extraction unit 202 as a teacher model and the extraction unit 211 as a student model. However, the learning by the relearning unit 901 is not limited to distillation, and a similar effect can be obtained by a general learning method in which learning is performed such that the feature vector 502 approaches the correct vector associated with the image 301. Therefore, the learning method by the relearning unit 901 is not limited to distillation.

In addition, a numerical value, processing timing, order of processing, a main unit of processing, a transmission destination/transmission source/storage location of data (information) and the like that are used in each embodiment and each modification described above are given as an example to provide specific explanation, and are not intended to be limited to such an example.

In addition, a portion or all of the respective embodiments and the respective modifications explained above may be used in combination as appropriate. In addition, a portion or all of the respective embodiments and the respective modifications explained above may be used selectively.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-060798, filed Mar. 31, 2022, and Japanese Patent Application No. 2023-010488, filed Jan. 26, 2023 which are hereby incorporated by reference herein in their entirety.

What is claimed is:

1. An information processing apparatus comprising:
a processor; and
a memory, including instructions stored thereon, which when executed by the processor cause the apparatus to:
divide a hierarchical structure of a teacher model for obtaining a feature vector of input data into a plurality of sub-structures, configure a replacement hierarchical structure in which, for each sub-structure of interest in the hierarchical structure, the sub-structure of interest is replaced with a feature extraction unit corresponding to the sub-structure of interest, wherein the replacement hierarchical structure is configured using the feature extraction unit and a sub-structure other than the sub-structure of interest in the hierarchical structure of the teacher model, and perform learning of, for each sub-structure of interest, the feature extraction unit corresponding to the sub-structure of interest, based on an output of a final layer of the replacement hierarchical structure with respect to the input data and an output of a final layer of the teacher model with respect to the input data; and
generate a student model having a hierarchical structure for obtaining a feature vector of input data using the learned feature extraction units.

2. The information processing apparatus according to claim 1, wherein the instructions, when executed by the processor, further cause the apparatus to: generate the student model by coupling the learned feature extraction units corresponding to the plurality of sub-structures.

3. The information processing apparatus according to claim 1, wherein the instructions, when executed by the processor, further cause the apparatus to: generate the student model by coupling (i) learned feature extraction units with respect to some sub-structures among the plurality of sub-structures and (ii) a sub-structure excluding the some sub-structures in the plurality of sub-structures.

4. The information processing apparatus according to claim 1, wherein the instructions, when executed by the processor, further cause the apparatus to: perform relearning of the student model based on an output of the teacher model with respect to the input data and an output of the student model with respect to the input data.

5. The information processing apparatus according to claim 1, wherein the instructions, when executed by the processor, further cause the apparatus to: perform relearning of the student model based on an output of the teacher model with respect to the input data and data associated with the input data.

6. The information processing apparatus according to claim 1, wherein the feature extraction unit has a configuration having a smaller calculation amount than a sub-structure corresponding to the feature extraction unit.

7. The information processing apparatus according to claim 1, wherein the feature extraction unit has a configuration in which a parameter data amount is smaller than that of a sub-structure corresponding to the feature extraction unit.

8. An information processing method performed by an information processing apparatus comprising:

dividing a hierarchical structure of a teacher model for obtaining a feature vector of input data into a plurality of sub-structures, configuring a replacement hierarchical structure in which, for each sub-structure of interest in the hierarchical structure, the sub-structure of interest is replaced with a feature extraction unit corresponding to the sub-structure of interest, wherein the replacement hierarchical structure is configured using the feature extraction unit and a sub-structure other than the sub-structure of interest in the hierarchical structure of the teacher model, and performing learning of, for each sub-structure of interest, the feature extraction unit corresponding to the sub-structure of interest, based on an output of a final layer of the replacement hierarchical structure with respect to the input data and an output of a final layer of the teacher model with respect to the input data; and generating a student model having a hierarchical structure for obtaining a feature vector of input data using the learned feature extraction units.

9. A non-transitory computer-readable storage medium storing a computer program for causing a computer to:

divide a hierarchical structure of a teacher model for obtaining a feature vector of input data into a plurality of sub-structures, and perform learning of a feature extraction unit corresponding to the sub-structure based on input data input to the sub-structure and output data output from the sub-structure based on the input data; and generate a student model having a hierarchical structure for obtaining a feature vector of input data into a plurality of sub-structures, configuring a replacement hierarchical structure in which, for each sub-structure of interest in the hierarchical structure, the sub-structure of interest is replaced with a feature extraction unit corresponding to the sub-structure of interest, wherein the replacement hierarchical structure is configured using the feature extraction unit and a sub-structure other than the sub-structure of interest in the hierarchical structure of the teacher model, and performing learning of, for each sub-structure of interest, the feature extraction unit corresponding to the sub-structure, based on an output of a final layer of the replacement hierarchical structure with respect to the input data and an output of a final layer of the teacher model with respect to the input data.

10. An information processing apparatus comprising:

a student model;

a processor; and a memory, including instructions stored thereon, which when executed by the processor cause the apparatus to:

divide a hierarchical structure of a teacher model for obtaining a feature vector of input data into a plurality of sub-structures, configure a replacement hierarchical structure in which, for each sub-structure of interest in the hierarchical structure, the sub-structure of interest is replaced with a feature extraction unit corresponding to the sub-structure of interest, wherein the replacement hierarchical structure is configured using the feature extraction unit and a sub-structure other than the sub-structure of interest in the hierarchical structure of the teacher model, and perform learning of, for each sub-structure of interest, the feature extraction unit corresponding to the sub-structure, based on an output of a final layer of the replacement hierarchical structure with respect to the input data and an output of a final layer of the teacher model with respect to the input data, wherein the student model has a hierarchical structure for obtaining a feature vector of input data using the learned feature extraction units; and output a feature vector with regard to an image input to the student model.

11. An information processing method comprising:

outputting a feature vector with regard to an image input to a student model, dividing a hierarchical structure of a teacher model for obtaining a feature vector of input data into a plurality of sub-structures, configure a replacement hierarchical structure in which, for each sub-structure of interest in the hierarchical structure, the sub-structure of interest is replaced with a feature extraction unit corresponding to the sub-structure of interest, wherein the replacement hierarchical structure is configured using the feature extraction unit and a sub-structure other than the sub-structure of interest in the hierarchical structure of the teacher model, and perform learning of, for each sub-structure of interest, the feature extraction unit corresponding to the sub-structure, based on an output of a final layer of the replacement hierarchical structure with respect to the input data and an output of a final layer of the teacher model with respect to the input data, and wherein the student model has a hierarchical structure for obtaining a feature vector of input data using the learned feature extraction units.

12. The information processing apparatus according to claim 1, wherein the instructions, when executed by the processor, further cause the apparatus to: perform repeatedly, every time the sub-structure of interest is replaced with the feature extraction unit corresponding to the sub-structure of interest, learning of the feature extraction unit corresponding to the sub-structure of interest based on the output of the final layer of the replacement hierarchical structure with respect to the input data and the output of the final layer of the teacher model with respect to the input data.

* * * * *